United States Patent Office 2,789,140
Patented Apr. 16, 1957

2,789,140

PROCESS OF PREPARING TETRA SUBSTITUTED 2,2',4,4'-BENZOPHENONES

William H. Von Glahn, Loudonville, and Lester N. Stanley, Delmar, N. Y., assignors to General Aniline & Film Corporation, New York, N. Y., a corporation of Delaware No Drawing. Application December 29, 1955,
Serial No. 556,111

6 Claims. (Cl. 260—591)

This invention relates to an improved process of preparing at least one tetra substituted 2,2',4,4'-benzophenones having one but not more than three hydroxy groups.

2,2'-dihydroxy-4,4'-dialkoxy benzophenones are currently preparing by condensing 2 moles of resorcinol dialkyl ether with 1 mole of phosgene in the presence of 2 moles of aluminum chloride and in the presence of a chlorinated hydrocarbon at a temperature ranging between 4°–55° C. followed by isolation. The reaction, which is described in U. S. P. 2,693,492, is not very consistent in actual commercial practice and the product may vary considerably for the following reasons: In the case of the product produced from resorcinol dimethyl ether, assuming an initial formation of tetramethoxybenzophenone, theoretically there are nine different demethylation products including various mono-, di- and tri-hydroxy isomers as well as the completely demethylated tetrahydroxybenzophenone.

According to Example 1 of said patent where in anhydrous aluminum chloride is employed, a product is obtained which, on purification, has a melting point of 137–138° C. Presumably this is a relatively pure 2,2'-dihydroxy-4,4'-dimethoxybenzophenone. This product has very poor solubility in organic solvents which are used in the application of such products, namely ethyl acetate and methyl ethyl ketone. The solubility in these two solvents is a criterion of the suitability of these products.

We have found that it is possible to modify the reactivity of the aluminum chloride in the aforementioned condensation reaction by the addition of measured small amounts of water so that the resulting product has a melting point which ranges between about 95° C. to 109° C., and which product has excellent solubility in the above listed organic solvents. The product can be varied from one having a melting point to about 95° C. to one having a melting point of about 108° C. by varying the amount of water added, as will be shown in the working examples. The theory is not known, but it may be that water reacts with part of the aluminum chloride to form catalytic amounts of a hydrate or basic aluminum oxide or other complex which modifies the reactivity of the aluminum chloride, especially during the demethylation.

Accordingly, it is an object of the present invention to provide an improved process of preparing 2,2'-4,4'-alkoxyhydroxy benzophenones of consistent physical properties such as melting point and better solubility in organic solvents.

Other objects and advantages will become manifest from the following description.

The improved process is carried out by first dissolving one mole of a resorcinol dialkyl ether such as 1,3-dimethoxy benzene, 1,3-diethoxy benzene, 1,3-dipropoxy benzene, 1,3-dibutoxy benzene, 1,3-diamyloxy benzene, 1,3-dihexyloxy benzene, 1,3-dioctyloxy benzene, 1,3-lauryloxy benzene, 1,3-octadecyloxy benzene and the like in an inert solvent diluent such as, for example, ethylene dichloride, di-, tri- and tetra-chlorethane, nitrobenzene, carbon disulfide and the like. It is to be noted that the nature or character of the inert solvent diluent is immaterial so long as it is inert to the reactants and the reaction products under the conditions of reaction. The solution of resorcinol dialkyl ether is cooled to a temperature of 0°–10° C. and 1–1.25 moles of anhydrous aluminum chloride added with stirring together with 1–2.5% of water based on the weight of the anhydrous aluminum chloride and the temperature maintained around 0°–10° C., preferably at 0° C. 0.5 mole of phosgene per mole of resorcinol dialkyl ether, preferably a slight excess not exceeding 0.75 mole is passed into the charge at a temperature ranging between 0°–10° C. preferably at 0° C. with agitation. The temperature is then raised to a range from about 50° C. to the reflux temperature of the solvent, but not above 85° C., and preferably at a temperature between 50°–70° C. during a period of time ranging between 6*8 hours and maintained at that temperature for 2–4 hours. It is to be noted that the aluminum chloride is in the amount of 1 mole per mole of resorcinol dialkyl ether, preferably in slight excess up to 25%, i. e. from 1–1.25 moles. A too large amount of aluminum chloride promotes excessive demethylation and poor solubility in the aforementioned solvents, and accordingly, therefore, should not exceed 1:25 moles. The resulting solution is cooled to a temperature ranging between 0°–10° C., preferably at 0° C. and decomposed with ice and mineral acid, e. g. hydrochloric, sulfuric, etc., the organic layer is separated and extracted once or twice with an aqueous sodium or potassium hydroxide, of 10–20% concentration. The basic solution after separation of the residual solvent and acidification yields a pale yellowish solid which has a more consistent melting point and a better solubility in organic solvents than the product usually obtained with aluminum chloride alone.

Instead of employing one mole of a particular resorcinol dialkyl ether a mixture of dimethyl, diethyl, dipropyl, etc., ethers may be prepared, and the 1 mole mixture condensed with the phosgene as above described to yield a product consisting of a mixture of the corresponding benzophenones.

The products prepared in accordance with the present invention are characterized by the following general formula:

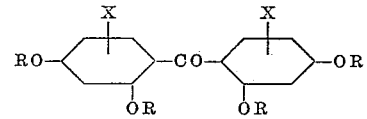

wherein the R's represent either hydrogen or alkyl group containing from 1 to 18 carbon atoms with the clear understanding that at least one R and not more than 3 must be hydrogen, and wherein the X's may be the same or different and represent hydrogen or an alkyl group containing from 1 to 18 carbon atoms.

The products are employed as protective materials against ultraviolet light fading in various colorless plastics, resins, film-forming material and the like.

The resulting product of all of the following examples consists of a mixture containing 2-hydroxy-2',4,4'-trialkoxy benzophenone, 2,2'-dihydroxy-4,4'-dialkoxy benzophenone and 2,2',4-trihydroxy-4'-alkoxy benzophenone, with a small and insignificant amount of 2,2'4,4'-tetrahydroxy benzophenone.

The following examples illustrate the preparation of the mixture of compounds in accordance with the improved process of the present invention. It is to be clearly understood that these examples are merely illustrative and are not to be considered as being limitative.

Example I 0.71 mole (100 grams) of resorcinol dimethyl ether was dissolved in 500 cc. of ethylene dichloride. To this solution were added .82 mole (110 grams) of anhydrous aluminum chloride and 1% (1.1 grams) of water at 0° C. with agitation. While maintaining this temperature, 0.4 mole (40 grams) of phosgene was passed into the charge. The temperature was then raised to 67° C. over a period of 6–8 hours and then maintained at that temperature for 8 hours.

The reaction mass was cooled to 0° C. and drowned in 360 cc. of water, 360 grams of ice and 60 cc. of 33.3% hydrochloric acid. Extra ice was added to keep the temperature below 10° C. An additional 200 cc. of ethylene dichloride was then added and the charge heated to 65° C. until solution of the organic material in the solvent was complete.

The lower oil layer was separated, cooled to room temperature and to it was added 190 cc. of 15% by weight of caustic soda solution. After stirring for 15 minutes the ethylene dichloride layer was allowed to separate. The alkaline aqueous layer was filtered through filter cel. The filtrate was slowly added to 125 cc. of 33.3% hydrochloric acid and 600 cc. of ice and water, while maintaining the temperature below 10° C. The precipitated product was filtered, sucked dry, washed with water and dried. A product having a melting point of about 98° C. was obtained. The product consists of a mixture of 2-hydroxy-2',4,4'-trimethoxy benzophenone, 2,2'-dihydroxy-4,4'-dimethoxy benzophenone and 2,2',4-trihydroxy-4'-methoxy benzophenone with a small insignificant amount of 2,2',4,4'-tetrahydroxy benzophenone. It is to be noted that this product has the advantage in that it has far much better solubility in the previously mentioned solvents than the pure 2,2'-dihydroxy-4,4'-dimethoxy benzophenone, which melts at 137–138° C., and the homologous dialkoxy derivatives.

Example II

Example I was repeated with the exception that 2% of water, i. e. 2.2 grams was added instead of 1% based on the aluminum chloride. After isolation, filtering and drying, a product was obtained which has excellent solubility in the solvents named. Its melting point was 98° C.

Example III

Example I was again repeated with the exception that 2% of water was replaced by 2.5% of water and the temperature held at 67° C. for 12 hours. Following isolation, washing and drying, a product having a melting point of 108–109.4° C. was obtained. Its solubility in the organic solvents named was excellent.

Example IV

Example I was again repeated with the exception that the resorcinol dimethyl ether was replaced by .71 mole (120 grams) of resorcinol diethyl ether. After isolation, a pale yellowish product having good solubility and exhibiting ultraviolet absorbing characteristics was obtained.

Example V

Example I was repeated with the exception that the resorcinol dimethyl ether was replaced by .71 mole (140 grams) of resorcinol dipropyl ether. After isolation, a pale yellowish solid having good solubility in the organic solvents mentioned above and exhibiting ultraviolet absorbing properties was obtained.

Example VI

Example I was repeated with the exception that the resorcinol dimethyl ether was replaced by .71 mole (177.5 grams) of resorcinol diamyl ether. After isolation, a pale yellowish product having good solubility in the organic solvents mentioned above and exhibiting ultraviolet absorbing properties was obtained.

Example VII

Example I was repeated with the exception that the resorcinol dimethyl ether was replaced by .71 mole (217 grams) of resorcinol dioctyl ether. After isolation, a yellowish product having good solubility in the mentioned organic solvents and exhibiting ultraviolet absorbing properties was obtained.

Example VIII

Example I was repeated with the exception that the resorcinol dimethyl ether was replaced by .71 mole (107 grams) of 5-methyl resorcinol dimethyl ether. A pale yellowish product was obtained which has good solubility properties and good ultraviolet absorbing characteristics.

Example IX

Example I was repeated with the exception that the resorcinol dimethyl ether was replaced by .71 mole (283 grams) of 5-pentadecyl resorcinol dimethyl ether. The caustic extraction of Example I was not carried out in this case because of the poor solubility of the sodium salts. Instead of extracting with caustic soda solution, the product mixture was isolated by distilling off the solvent. This procedure should be followed whenever a resorcinol dialkyl ether containing an alkyl substituent having more than 8 carbon atoms is utilized in the condensation reaction. A pale yellowish product of good solubility properties was obtained which has ultraviolet absorbing characteristics.

We claim:

1. The process of preparing at least one tetra substituted 2,2',4,4'-benzophenone having the following general formula:

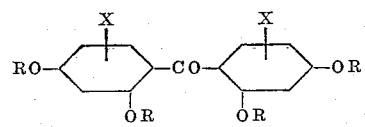

wherein the R's and X's represent a member selected from the class consisting of hydrogen and alkyl of 1 to 18 carbon atoms and wherein one R and not more than 3 represent hydrogen which comprises treating one mole of resorcinol dialkyl ether with 0.5–0.75 mole of phosgene in the presence of 1–1.25 moles of aluminum chloride, 1–2.5% of water based on the weight of the aluminum chloride in the presence of an inert solvent-diluent at a temperature ranging between 0° and 10° C., raising the temperature slowly to a temperature ranging from 50° C. to the reflux temperature of the solvent-diluent not exceeding 85° C., decomposing the aluminum chloride complex at a temperature ranging between 0° and 10° C. with ice and mineral acid, and then separating the organic layer and isolating at least one of the said benzophenones.

2. The process according to claim 1 wherein the resorcinol dialkyl ether is resorcinol dimethyl ether.

3. The process according to claim 1 wherein the resorcinol dialkyl ether is resorcinol diethyl ether.

4. The process according to claim 1 wherein the resorcinol dialkyl ether is resorcinol dipropyl ether.

5. The process according to claim 1 wherein the resorcinol dialkyl ether is 5-methylresorcinol dimethyl ether.

6. The process according to claim 1 wherein the resorcinol dialkyl ether is 5-pentadecylresorcinol dimethyl ether.

No references cited.